(12) United States Patent
Weissbrich et al.

(10) Patent No.: US 6,290,593 B1
(45) Date of Patent: Sep. 18, 2001

(54) CIRCUIT FOR POWER SUPPLY OF A VENTILATION FAN AND A BATTERY BY MEANS OF SOLAR CELLS IN A MOTOR VEHICLE

(75) Inventors: Alfons Weissbrich, Gauting; Thomas Ganz, Stockdorf, both of (DE)

(73) Assignee: Webasto Karosseriesysteme GmbH, Stockdorf (DE)

( * ) Notice: Subject to any disclaimer, the term of this patent is extended or adjusted under 35 U.S.C. 154(b) by 0 days.

(21) Appl. No.: 09/031,062

(22) Filed: Feb. 26, 1998

(30) Foreign Application Priority Data

Mar. 1, 1997 (DE) .............................................. 197 08 368

(51) Int. Cl.$^7$ ....................................................... H02J 7/35
(52) U.S. Cl. .............................. 454/75; 136/293; 454/900
(58) Field of Search .............................. 454/75, 141, 143, 454/162, 164, 165, 900; 136/293

(56) References Cited

U.S. PATENT DOCUMENTS

| | | | |
|---|---|---|---|
| 4,209,346 | * | 6/1980 | King . |
| 4,741,256 | * | 5/1988 | Huang ............................ 454/900 X |
| 5,779,817 | * | 7/1998 | Wecker ............................ 454/900 X |

FOREIGN PATENT DOCUMENTS

| | | | |
|---|---|---|---|
| 29 52 080 | | 6/1981 | (DE) . |
| 36 10 767 | | 10/1987 | (DE) ..................................... 454/900 |
| 41 39 435 | | 6/1992 | (DE) ..................................... 454/900 |
| 42 01 164 | | 7/1992 | (DE) . |
| 42 29 756 | | 3/1994 | (DE) . |
| 42 42 100 | | 6/1994 | (DE) . |
| 61-31835 | * | 2/1986 | (JP) ..................................... 454/900 |
| 61-285331 | * | 12/1986 | (JP) ..................................... 454/900 |

\* cited by examiner

*Primary Examiner*—Harold Joyce
(74) *Attorney, Agent, or Firm*—Nixon Peabody LLP; David S. Safran

(57) ABSTRACT

A circuit for power supply of a ventilation fan for cooling the interior of a motor vehicle and/or a motor vehicle battery by means of solar cells, with a manually actuated switch for switching the solar cell power supply to the ventilation fan or battery. An automatic control provides a fully automatic mode for automatic switching of the solar cell power supply depending on the temperature in the motor vehicle interior and/or the battery charging state which can be overridden by activating an actuating element of a manually activated switch in a semiautomatic mode. Furthermore, there is an optical display for indicating which of the automatic and semiautomatic mode is activated.

12 Claims, 2 Drawing Sheets

CIRCUIT FOR POWER SUPPLY OF A VENTILATION FAN AND A BATTERY BY MEANS OF SOLAR CELLS IN A MOTOR VEHICLE

BACKGROUND OF THE INVENTION

1. Field of the Invention

The invention relates to a circuit for supplying power to a ventilation fan for cooling the interior of a motor vehicle and/or to a motor vehicle battery by means of solar cells, With a manually actuated switch for switching the solar cell power supply to the ventilation fan or battery.

2. Description of Related Art

A circuit of this type is known from German Patent 36 10 767 C2. The solar cell units are series connected in the position of the manually activated switch for supplying of solar cell current to the battery, while in the switch position for supplying solar cell current to the ventilation fan, the solar cells are connected in parallel in order to deliver, in the former case, a voltage above the battery voltage (conventionally 12 V), and in the latter case, to deliver a voltage below the battery voltage (conventionally roughly 6 V). Preferably, the manually activated switch is replaced by the ignition lock to vent and cool the motor vehicle interior with the vehicle stopped and with solar irradiation of the solar cells, while when driving the battery is charged.

German Patent DE 29 52 080 C2 discloses a circuit for solar cell power supply for a ventilation fan for cooling the interior of a motor vehicle which can be set selectively to summer or winter operation. During summer operation, the ventilation fan is started only beginning at a predetermined interior temperature.

German Patent DE 41 39 435 C2 discloses charging of the battery depending on its charging voltage and the no-load voltage of the solar cell in solar cell power supply of a motor vehicle battery.

Furthermore, different designs switches are known, including switches with rockers and switches with symbols which are assigned to their actuating element and which can be located directly on the actuating element, if necessary. Furthermore, light emitting diodes located in the actuating element of the switches are known for optical indication of the switch state. In this connection, for example, published German Patent Application DE 42 29 756 A1 discloses marking of the blocking position of a manual actuation element by means of an imprinted color or imprinted character symbol. A switch with the actuating element in the form of a rocker with button function in the neutral position and illuminated marking of all three switch positions is known from published German Patent Application DE 42 42 100 A1.

SUMMARY OF THE INVENTION

The primary object of the present invention is to devise a circuit of the initially mentioned type by which solar cell power supplied to a ventilation fan or to a battery can be optimally controlled and indicated.

This object is achieved by an automatic control having a fully automatic mode for automatic switching of the solar cell power supply depending on the temperature in the motor vehicle interior and/or the battery charging state, the automatic control being overridden by activating an actuating element of the manually actuated switch (producing a semiautomatic mode), and by optical display means for indicating which of the automatic and semiautomatic modes is active.

Accordingly, the circuit of the invention provides for a fully automatic operating mode in which fully automatic switching of the solar cell power supply to the ventilation fan or battery takes place depending on the parameters relevant to control. In addition, the circuit of the invention provides for a semiautomatic operating mode which can be activated by overriding the fully automatic operating mode by actuating the manually activated switch. In this way, independently of the fully automatic mode, the driver of a motor vehicle can select the ventilation mode or battery charging mode. The selected mode, i.e. the automatic or semiautomatic operating mode, is displayed by an optical display means.

The optical display means is advantageously integrated into the actuating element of the switch, preferably in the form of at least one light emitting diode. To display the current operating mode and/or the solar cell power supply to the battery or to the ventilation fan, it is advantageously provided either that the light emitting diode changes between light and dark and/or that the light emitting diode changes its blinking frequency.

According to one especially advantageous development of the invention, the actuating element of the manually activated switch is made as a rocker with a button function in the neutral position of the rocker for activating the automatic mode which can be overridden when the rocker is actuated in favor of a battery charging mode, the first rocker end position, or a ventilation mode, the second rocker end position.

Preferably, at the two rocker end segments there are symbols which designate the respective operating mode and light emitting diodes are assigned to these symbols for better recognition of the operating mode which are activated by actuating the respective rocker end.

Advantageously, a symbol which designates the automatic mode is likewise assigned to the rocker neutral position. Preferably, a light emitting diode is likewise assigned to this symbol and is activated by pressing the button.

To save current, the light emitting diodes can be operated in a blinking mode. Alternatively, in the rocker/light emitting diode design, the light emitting diode actuated at the time can change its display mode from the continuously lit mode into the blinking mode or vice versa, or can change color, if the solar cell power supply is insufficient for the respective operating mode. In this way, not only information about the respective operating mode is present, but also the capacity of the solar cells to deliver power.

These further objects, features and advantages of the present invention will become apparent from the following description when taken in connection with the accompanying drawings which, for purposes of illustration only, show a single embodiment in accordance with the present invention.

DETAILED DESCRIPTION OF THE PREFERRED EMBODIMENT

Figure 1:
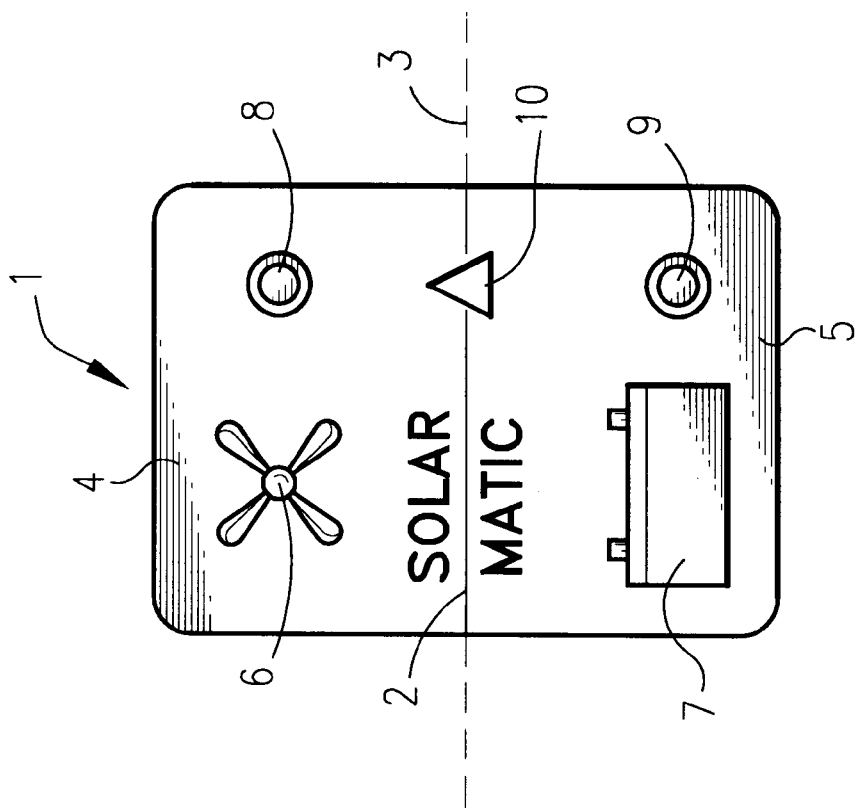
FIG. 1 shows an actuating element of a switch for a circuit in accordance with the invention in the form of a rocker.

In the FIG. 1, a rocker is generally labeled with reference number 1. Rocker 1 is made convexly curved or otherwise provided with a narrowed central region in a conventional manner such that its center region 2 is lower along rocker pivot axis 3 than it is at the two outer end regions 4 and 5. The outer end regions 4 and 5 are actuated to reverse a rocker switch (not shown).

The rocker switch, and thus its rocker 1, are kept in the neutral position, in which the rocker 1 is in the balanced position, i.e. the rocker end sections 4 and 5 are at the same level, by spring force.

The rocker switch for the circuit of the invention is, moreover, provided with a button function which can be activated by pressing the rocker 1 down in its central region 2. In other words, rocker 1 is prestressed perpendicular to its main surface by spring force into a neutral position which can be overcome by pressing on the rocker 1 in central region 2.

The ventilation mode of the circuit of the invention is assigned to upper end section 4 of rocker 1, while the battery charging mode is assigned to the lower end section 5. These functions are illustrated by the corresponding symbols, specifically by the schematic depiction of a fan 6 in upper end section 4 rocker 1 and a depiction of a battery 7 in lower end section 5 of rocker 1. In addition, light emitting diode 8 is assigned to the "fan" symbol and is integrated into rocker 1 in the same way as light emitting diode 9 which is assigned to battery symbol 7. Diodes 8 and 9 can emit light of different colors for additionally distinguishing the respective operating mode. Alternatively, to designate one operating mode a diode can be used and to designate the other operating mode two diodes can be used.

The fully automatic mode of the circuit of the invention is assigned to the button function in the central region of the rocker 1. This mode is identified by the label "SOLARM-ATIC" in the embodiment of rocker 1 shown, and it is also identified by another light emitting diode 10 which is integrated in the rocker 1 and assigned to this character.

Figure 2:
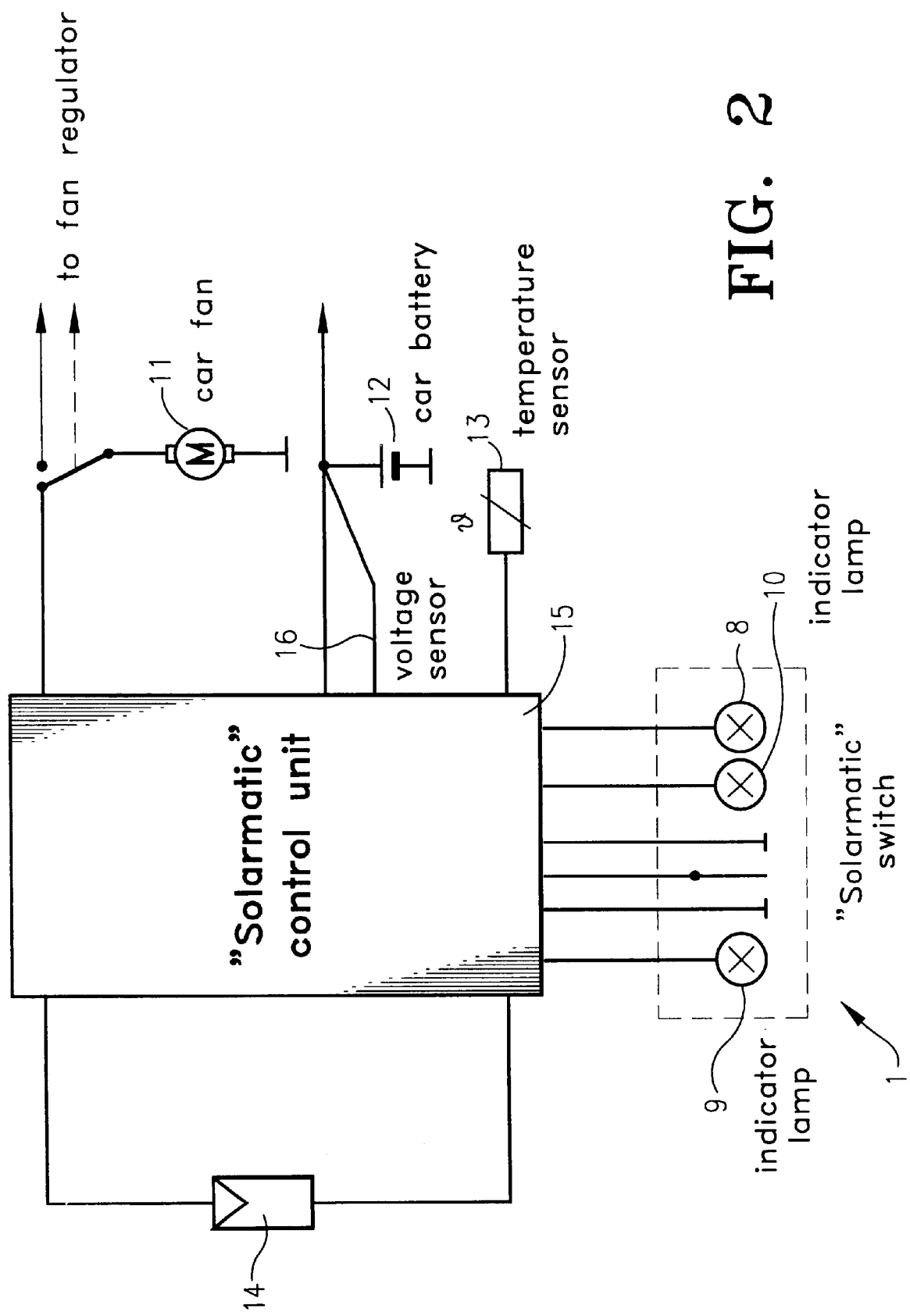
FIG. 2 shows a schematic of a control arrangement incorporating the actuating element of FIG. 1.

The circuit of the invention is such that, when the ignition is turned on, the fully automatic mode is activated, in which automatic controlling of the solar cell power supply takes place depending on the temperature in the motor vehicle interior as determined by temperatures sensor 13 (FIG. 2) and/or the battery charging state which is detected by a voltmeter 16. This fully automatic mode is identified by diode 10 lighting up.

If power is being supplied to the battery 12 by the solar cells 14 in the fully automatic mode and the driver of the motor vehicle wants cooling of the motor vehicle interior, he can override the fully automatic mode by actuating upper end section 4 of the rocker 1; this acknowledge by diode 8 lighting up and diode 10 going out. In this manually selected mode, the light emitting diode 8 which is assigned to the fan symbol 6 lights continuously or blinks. This manually selected operating mode can be canceled either by pressing rocker 1 back down in central region 10 (selection of automatic mode) or by actuating the other end section 5 of rocker 1 (selection of battery charging mode) whereupon light emitting diode 8 goes out and either light emitting diode 10 or light emitting diode 9 emits light. In this position, preferably battery 12 is charged and only a possible energy excess of solar cells 14 in case of a fully loaded battery 12 is used to drive the fan motor 11, if the interior temperature requires fan operation at the same time.

Alternatively, a logic can be formed in the circuit such that, when a predetermined temperature threshold is reached, the fully automatic operating mode is restarted proceeding from the ventilation mode (light emitting diode 10 lights), or alternatively, after a predetermined time interval has expired. The Solarmatic mode as well as the manual operating modes are controlled by control unit 15 which, for this reason, is connected to switch 1, solar cells 14, fan motor 11, voltmeter 16, vehicle battery 12 and interior temperature sensor 13.

The same of course applies in the manual selection of the battery charging mode proceeding from the automatic operating mode.

In the semiautomatic mode, the light emitting diodes 8 or 9 indicate a preferential usage of energy delivered by the solar cells 14 either for running the motor 11 of the car fan or for charging battery 12. Control unit 15 preferably enables a mode in which both the car fan 11 and the battery 12 are supplied at the same time if the amount of energy rendered by the solar cells 14 is sufficiently high.

The circuit of the invention can also be designed such that, which ever of the light emitting diodes 8, 9 or 10 is activated at the time is lit continuously when the solar cell power supply is in order and changes to a blinking mode, when the solar cell power supply is inadequate for the respective operating mode, or vice versa. Alternatively, the light emitting diode activated at the time can be made to change its color to indicate to the driver that the solar cell voltage present is inadequate for the respective operating mode.

While a single embodiment in accordance with the present invention has been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Circuit for selectively supplying power, in three different modes, (1) to a ventilation fan for cooling the interior of a motor vehicle, (2) to a motor vehicle battery for charging thereof, and (3) to both the ventilation fan and the motor vehicle battery by means of solar cells, comprising a manually actuated switch positioned relative to the solar cells for switching the solar cells to at least one of the ventilation fan and the battery for implementing mode (1), mode (2), or mode (3), a control having a fully automatic operation for automatic switching of power from the solar cells between said different modes depending on at least one of the temperatures in the motor vehicle interior and the battery charging state, and a semiautomatic operation in which the automatic control is overridden by activation of an actuating element of the manually actuated switch, and an optical display means for indicating implementation of at least one of the automatic operation and the semiautomatic operation.

2. Circuit as claimed in claim 1, wherein said optical display means is integrated into the actuating element of the switch.

3. Circuit as claimed in claim 2, wherein the optical display means comprises at least one light emitting diode.

4. Circuit as claimed in claim 3, wherein the light emitting diode is color changeable and changes color depending on at least one of the operating mode and to which of the battery and the ventilation fan power is being supplied from the solar cells.

5. Circuit as claimed in claim 3, wherein the light emitting diode has a blinking frequency which changes depending on at least one of the operating mode and to which of the battery and the ventilation fan power is being supplied from the solar cells.

6. Circuit as claimed in claim 5, wherein the actuating element of the manually activated switch is a rocker, and wherein symbols which designate a given operating mode are assigned to two end sections of the rocker.

7. Circuit as claimed in claim 6, wherein light emitting diodes which are activated by actuating respective end sections of the rocker are assigned to the symbols.

8. Circuit as claimed in claim 1, wherein the actuating element of the manually activated switch is a rocker with a push button function in a neutral position of the rocker for activating the automatic mode, which can be overridden when the rocker is actuated in favor of one of a battery charging mode and a ventilation mode in the semiautomatic mode.

9. Circuit as claimed in claim 8, wherein a symbol which designates the automatic operating mode is assigned to the rocker neutral position.

10. Circuit as claimed in claim 8, wherein a light emitting diode which is activated by actuating the push button function is assigned to the rocker neutral position.

11. Circuit as claimed in claim 7, wherein the light emitting diodes are operable in the blinking mode.

12. Circuit as claimed in claim 7, wherein each of the light emitting diodes has a display mode which is actuatable when the respective end section of the rocker is actuated and power from the solar cells is insufficient for the operating mode assigned to said respective end section of the rocker.

* * * * *